(No Model.)

J. C. RODMAN.
MINNOW BUCKET.

No. 247,689.        Patented Sept. 27, 1881.

Witnesses:
J. F. Donahoe
DeWitt C. Goodrich

Inventor:
John C. Rodman

UNITED STATES PATENT OFFICE.

JOHN C. RODMAN, OF PAOLA, KANSAS.

MINNOW-BUCKET.

SPECIFICATION forming part of Letters Patent No. 247,689, dated September 27, 1881.

Application filed May 24, 1881. (No model.)

*To all whom it may concern:*

Be it known that I, JOHN C. RODMAN, of Paola, in the county of Miami and State of Kansas, have invented a new and useful Improvement in Minnow-Buckets, of which the following is a specification, reference being had to the accompanying drawings, forming a part hereof, and in which—

Figure 2:
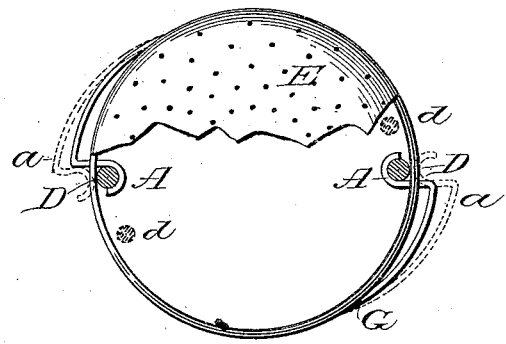
Figure 1:
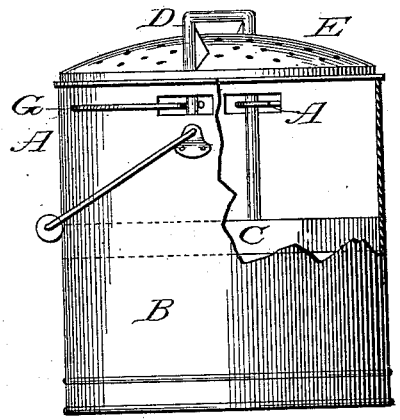

Figure 1 is a side view of the bucket, and Fig. 2 a top view of the same.

Like letters of reference indicate like parts.

My invention consists in a novel arrangement and combination of parts, as will be hereinafter described, and pointed out in the claim.

Fig. 1 represents the bucket with a section of the side broken away to expose the inside or working parts. Fig. 2 exhibits a top view or plan, with a portion of the perforated lid broken away to show my improvement.

In Fig. 1, B represents the bucket proper.

C represents a movable or sliding pan, to move up and down on the inside of the bucket in conjunction with the lid.

E represents the perforated lid.

D D are slides which pass downward through the lid to the pan C, to both of which they are soldered, thereby working together as a whole.

A A represent spring-guides, through which the slides D D pass and are held to their proper places. One end of these guides is soldered to the outside of the bucket at G. The opposite or free ends are bent inward for a distance, and then brought back in shape of semicircular loops, as can be seen by reference to A A in Fig. 2. These loops pass through horizontal slots to the inside of the bucket and encircle the slides D D. (Shown in cross-section in Fig. 2.)

The object of my invention is as follows: To enable the inner pan, C, together with the lid E, to be readily removed from the bucket, so as to clean out any dirt or sediment which may settle to the bottom, and also to repair any damage happening to the bucket or pan, which would be difficult to do with a flange soldered to the top of the bucket, through which the slides D D passed, as formerly made, the two spring-guides A A must be pressed inward sufficiently far to free the slides D D. Then turn the slides away from the slide-loops until they occupy the position indicated by *d d* in Fig. 2. The guides A A, being thus released, will fly outward, as shown by the dotted lines *a a* in Fig. 2. The inside of the bucket thus being free from all obstruction, the pan C, together with top E, can be entirely removed from the bucket.

Having thus described my invention, what I claim as new, and desire to secure by Letters Patent, is—

The spring-guides A A, in combination with the bucket B, the slides D D, and movable pan C, substantially as shown and described, and for the purpose as set forth.

JOHN C. RODMAN.

Witnesses:
 DE WITT C. GOODRICH,
 J. F. DONAHOE.